United States Patent [19]

Stanley et al.

[11] Patent Number: 5,925,799
[45] Date of Patent: Jul. 20, 1999

[54] CATALYTIC DISTILLATION AND HYDROGENATION OF HEAVY UNSATURATES IN AN OLEFINS PLANT

[75] Inventors: Stephen J. Stanley, Matawan; Charles Sumner, Livingston, both of N.J.

[73] Assignee: ABB Lummus Global Inc., Bloomfield, N.J.

[21] Appl. No.: 08/914,712

[22] Filed: Aug. 19, 1997

Related U.S. Application Data

[63] Continuation-in-part of application No. 08/613,594, Mar. 12, 1996, abandoned.

[51] Int. Cl.$^6$ ................................................ C07C 5/00
[52] U.S. Cl. ..................... 585/259; 585/256; 585/260; 585/264; 585/265; 585/809; 203/DIG. 6; 203/29; 208/143; 208/144
[58] Field of Search .................................. 585/256, 259, 585/260, 264, 265, 809, 808; 203/DIG. 6, 29; 208/143, 144

[56] References Cited

U.S. PATENT DOCUMENTS

| | | | |
|---|---|---|---|
| 4,443,559 | 4/1984 | Smith, Jr. ................................ | 502/527 |
| 5,087,780 | 2/1992 | Arganbright .............................. | 585/259 |
| 5,461,178 | 10/1995 | Harandi .................................. | 585/259 |
| 5,595,634 | 1/1997 | Hearn et al. ............................. | 203/29 |
| 5,679,241 | 10/1997 | Stanley et al. ........................... | 208/92 |

FOREIGN PATENT DOCUMENTS

WO 95/15934   6/1995   WIPO .

OTHER PUBLICATIONS

Kirk–Othmer; Encyclopedia of Chemical Technology; $2^{nd}$ and $4^{th}$ edition; vol. 8 and 9; 1965 and 1994.
Stone & Webster–Badger, "Ethylene Production"; The Lummus Company, Ethylene and Propylene; Petroleum Refiner, vol. 32, No. 11, pp. 130–131, Nov. 1953.

*Primary Examiner*—Glenn A. Caldarola
*Assistant Examiner*—Thuan D. Dang
*Attorney, Agent, or Firm*—Alix, Yale & Ristas, LLP

[57] ABSTRACT

In an olefins plant for the production and recovery of ethylene and propylene, the hydrogenation of the $C_2$ acetylenes, the $C_3$ acetylenes and dienes and the $C_4$ and heavier acetylenes, dienes and olefins and the selective separation of the resulting products is carried out by the use of various arrangements of one or more reaction distillation columns. These columns contain a hydrogenation catalyst in enriching and stripping sections and concurrently perform a catalytic hydrogenation reaction and a distillation function.

15 Claims, 9 Drawing Sheets

CATALYTIC DISTILLATION AND HYDROGENATION OF HEAVY UNSATURATES IN AN OLEFINS PLANT

This application is a continuation-in-part of application Ser. No. 08/613,594 now abandoned filed on Mar. 12, 1996.

BACKGROUND OF THE INVENTION

The present invention relates to a process system for the production of olefins and particularly to processing the charge gas feed to more effectively recover the product and process the by-products.

Ethylene, propylene and other valuable petrochemicals are produced by the thermal cracking of a variety of hydrocarbon feedstocks ranging from ethane to heavy vacuum gas oils. In the thermal cracking of these feedstocks, a wide variety of products are produced ranging from hydrogen to pyrolysis fuel oil. The effluent from the cracking step, commonly called charge gas or cracked gas, is made up of this full range of materials which must then be separated (fractionated) into various product and by-product streams followed by reaction (hydrogenation) of at least some of the unsaturated by-products.

The typical charge gas stream, in addition to the desired products of ethylene and propylene, contains $C_2$ acetylenes, $C_3$ acetylenes and dienes and $C_4$ and heavier acetylenes, dienes and olefins as well as a significant quantity of hydrogen. In the majority of prior processes, the $C_2$ acetylenes and $C_3$ acetylenes and dienes and the $C_5$ and heavier dienes, acetylenes and olefins are catalytically hydrogenated in fixed bed reactors using a series of commercially available catalysts. In a growing number of applications, the $C_4$ acetylenes, dienes, and olefins are also catalytically hydrogenated in fixed bed reactors. These separate hydrogenation steps take place in one of two process sequences. In a typical prior art process, the charge gas is compressed to between 2.76 and 4.14 MPa (400 and 600 psia). It is then progressively chilled condensing the $C_2$ and heavier components. Hydrogen is cryogenically recovered and methane is fractionated out of the stream. The remaining $C_2$ and heavier stream enters a series of fractionation towers. The first tower, the deethanizer, produces an overhead stream containing the $C_2$ acetylenes, olefins, and paraffins. This stream is sent to a fixed bed, vapor phase reactor where the $C_2$ acetylene is selectively hydrogenated using the hydrogen cryogenically separated earlier from the charge gas stream.

The second tower in this sequence, the depropanizer, produces an overhead stream containing the $C_3$ acetylenes, dienes, olefins and paraffins. This stream is sent to a fixed bed, vapor or liquid phase reactor where the $C_3$ acetylenes and dienes are selectively hydrogenated using the hydrogen cryogenically separated earlier from the charge gas stream.

The third tower, the debutanizer, produces an overhead stream containing the $C_4$ acetylenes, dienes, olefins, and paraffins. This stream is then sent either to battery limits as a final product or to a fixed bed, liquid phase reactor where the dienes, acetylenes, and in some instances the olefins are hydrogenated using the hydrogen cryogenically recovered previously from the charge gas.

The bottoms of the third tower contains the $C_5$ and heavier dienes, acetylenes, olefins and paraffins. This stream is sent to a series of two fixed bed, liquid phase reactors. In the first, the acetylenes and dienes are catalytically hydrogenated. The olefins are catalytically hydrogenated in the second reactor. Both reactors utilize the hydrogen cryogenically recovered previously from the charge gas. In some applications, the third tower produces an overhead stream containing both the $C_4$ and $C_5$ acetylenes, dienes, olefins, and paraffins. These are hydrogenated as discussed previously for the $C_4$'s alone, in a single fixed bed, liquid phase reactor. The $C_6$ and heavier dienes, acetylenes, olefins and paraffins exit in the bottoms of the third tower and are hydrogenated as discussed previously in two fixed bed, liquid phase reactors.

In a variation of the typical process just described, the cracked gas is compressed to between 2.07 and 3.45 MPa (300 and 500 psia) and sent to a fractionation tower. The overhead of the tower is the $C_3$ and lighter portion of the charge gas. It is sent to a series of fixed bed, vapor phase reactors where the $C_2$ acetylene and a portion of the $C_3$ acetylenes and dienes are hydrogenated using a small portion of the hydrogen contained in the $C_3$ and lighter stream. The unhydrogenated portion of the $C_3$ acetylenes and dienes as well as the $C_4$ and heavier acetylenes, dienes, and olefins are hydrogenated in a fashion similar to that described above. In many new olefin plants, butadienes are hydrogenated to olefins or butadienes and butenes are totally hydrogenated to butanes. In some cases, the saturated $C_4$'s, and in some instances the saturated $C_5$'s also, are recycled to the cracking heaters.

While widely practiced, the typical processes described above have a number of disadvantages. Where the unsaturated $C_3$'s (methyl acetylene and propadiene), $C_4$'s and gasoline (including the $C_5$'s) are being hydrogenated, at least three separate fixed bed reactors are required. If gasoline is being hydrogenated in two stages, the number of fixed bed reactors is four. This number of fixed bed reactors contributes significantly to the capital cost of the system and to the operational complexity. Even when a system is used which processes the $C_4$ and $C_5$ unsaturates together, rather than the $C_4$'s separately and the $C_5$'s together with the gasoline, one less fractionating tower is required but the number of hydrogenation reactors remains the same.

SUMMARY OF THE INVENTION

The present invention involves the recovery of ethylene and propylene in an olefins plant and the hydrogenation and separation of the heavier unsaturates. An object of the present invention is to provide a method for the selective hydrogenation of the $C_2$ acetylenes and the $C_3$ acetylenes and dienes to produce additional ethylene and propylene and the hydrogenation of the $C_4$ and heavier acetylenes, dienes and olefins to alkanes all without the hydrogenation of the ethylene and propylene and the selective separation of the resulting products in a process scheme which minimizes the required number of reactors and fractionators thereby minimizing capital and operational costs. More specifically, the invention involves the use of a novel arrangement of combined reaction-fractionation steps known as catalytic distillation to simultaneously carry out the hydrogenation reactions and the desired separations.

DESCRIPTION OF THE PREFERRED EMBODIMENTS

Figure 1:
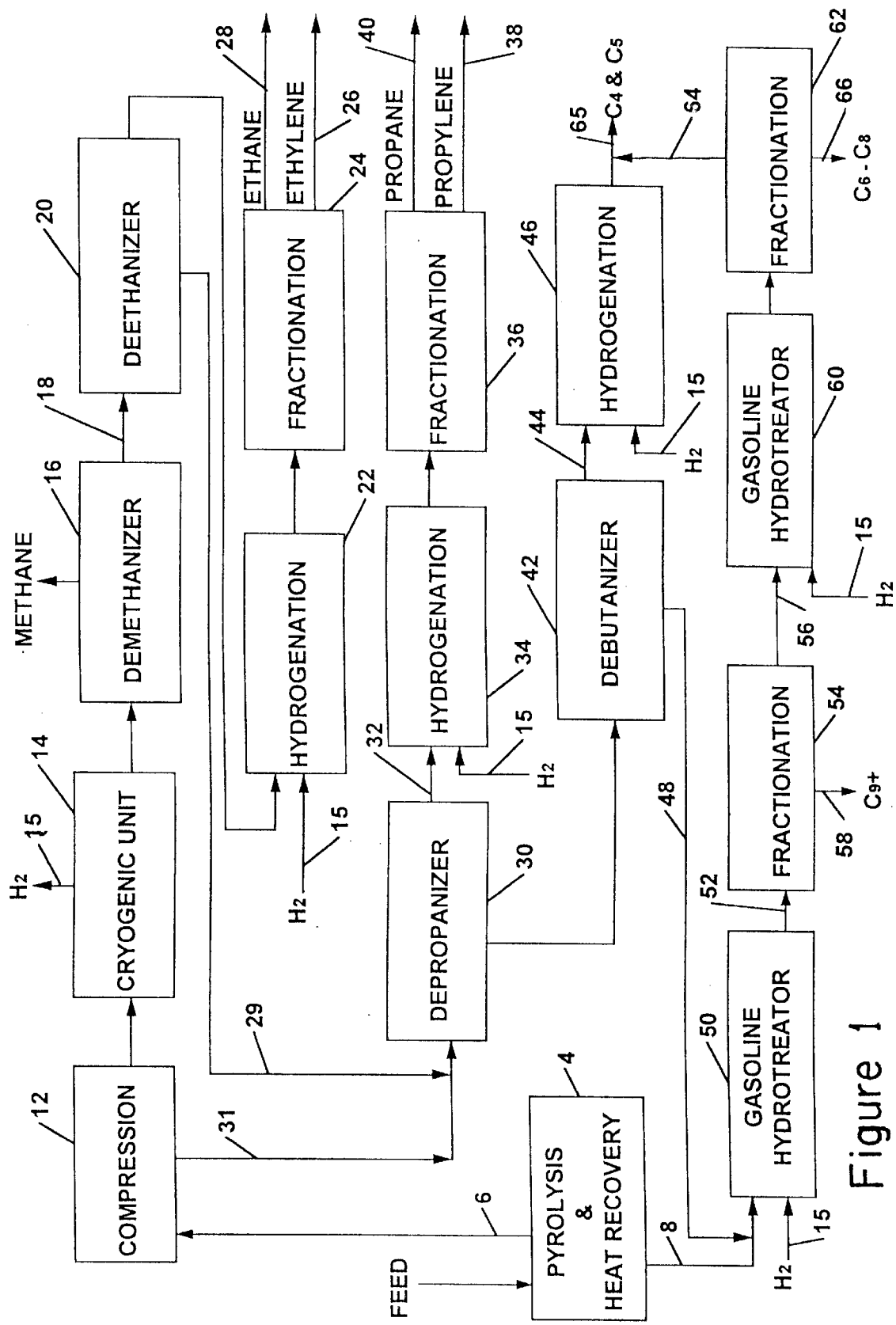
FIG. 1 is a flow sheet for a conventional prior art olefin plant.

Referring first to FIG. 1 which illustrates a conventional prior art olefin plant, the typical pyrolysis and associated heat recovery units, generally designated 4, produce a charge gas 6 and a heavies stream 8 consisting mainly of $C_8$ and heavier components. The charge gas 6 is first compressed at 12 up to a pressure of 2.76 to 4.14 MPa (400 to 600 psia). The majority of the compressed gas then undergoes cryogenic treatment at 14 to separate hydrogen 15 followed by separation of methane at 16. A small portion of the $C_3$ and heavier material condenses in the compressor train and often bypasses the cryogenic demethanization and deethanization steps going directly to the depropanizer 30 as stream 31. The gas stream 18 is then deethanized at 20 with the $C_2$ acetylenes in the $C_2$ gas stream being hydrogenated at 22 with hydrogen 15 and fractionated at 24 to produce essentially ethylene 26 and ethane 28. The bottoms 29 from the deethanizer 20 are depropanized at 30 with the separated $C_3$ acetylenes and dienes in the $C_3$ stream 32 being hydrogenated at 34 also with hydrogen 15 and fractionated at 36 to produce essentially propylene 38 and propane 40. Likewise, the bottoms from the depropanizer 30 are debutanized at 42 producing the $C_4$ stream 44 which is hydrogenated at 46.

The $C_5+$ stream 48 is fed to the gasoline hydrotreater 50 along with the heavies 8 from the front end of the system and hydrogen 15. The $C_5+$ stream including the heavies from the front end are usually hydrogenated in two stages. In the first stage, the diolefins and acetylenes are hydrogenated. In the second stage, olefins are hydrogenated and sulfur compounds are converted to hydrogen sulfide. The partially hydrogenated product 52 from the first gasoline hydrotreater 50 is then fractionated at 54 which removes the $C_5$'s to $C_8$'s as overhead 56 leaving the $C_9+$ as a bottoms product 58. The overheads 56 are then further hydrogenated at 60 followed by fractionation at 62 producing the overhead 64 of saturated $C_5$'s and a bottoms gasoline product 66 of saturated $C_6$'s to $C_8$'s. The $C_5$ stream 64 is combined with the saturated $C_4$ stream from the hydrogenation step 46 and the combined stream 65 of the $C_4$'s and $C_5$'s is usually recycled to the pyrolysis heaters. The ethane and propane streams 28 and 40 may also be recycled to the pyrolysis heaters.

Figure 2:
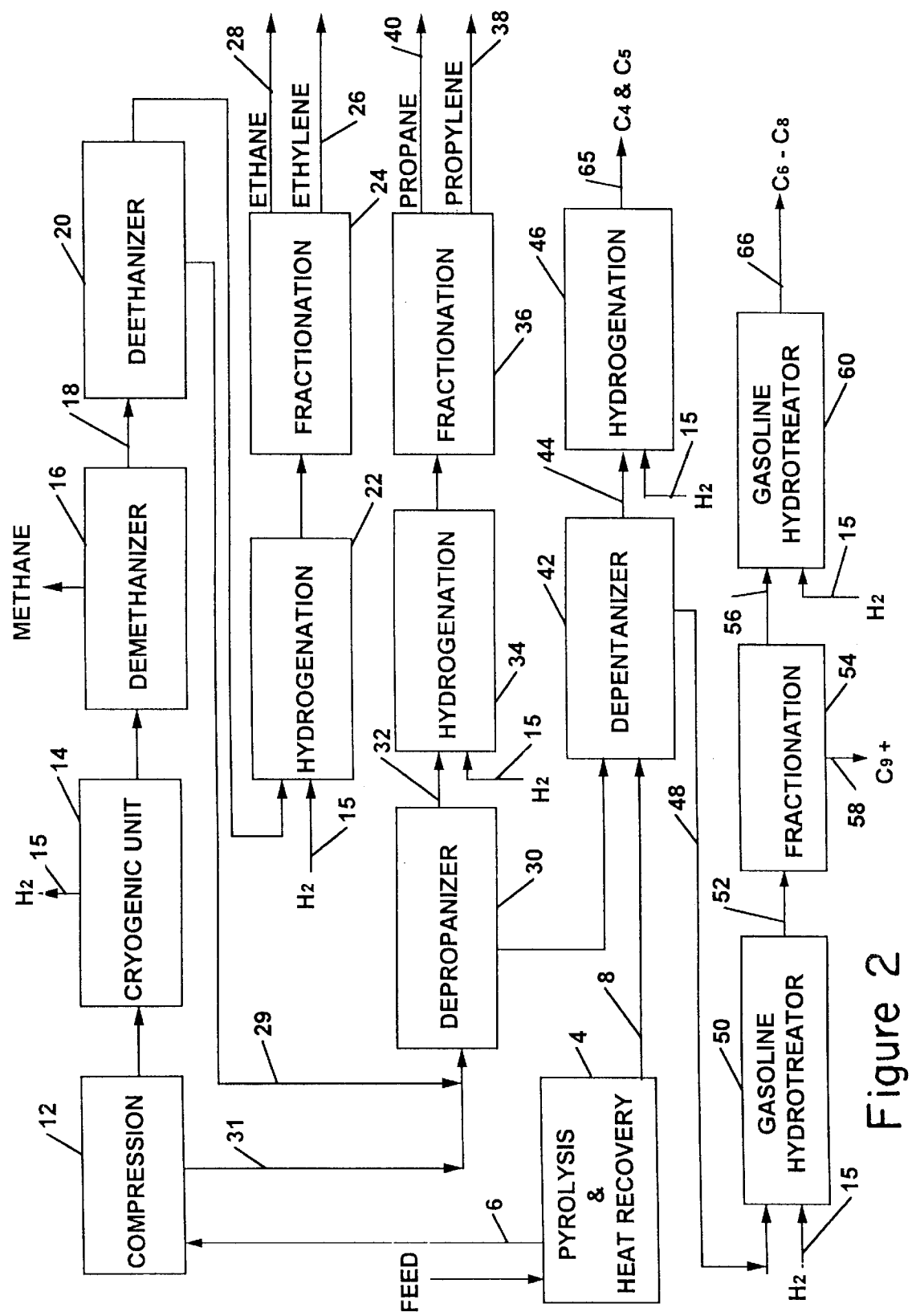
FIG. 2 is a flow sheet for a modified prior art olefin plant.

FIG. 2 illustrates a prior art variation of the process shown in FIG. 1 wherein the $C_4$ and $C_5$ unsaturates are processed together rather than processing the $C_4$'s separate from the $C_5$'s as in FIG. 1 where the $C_5$'s are processed with the gasoline. In this FIG. 2 embodiment, the $C_4+$ bottoms from the depropanizer 30 together with the heavies 8 from the front end of the system are fed to the fractionator 42 which is now operated as a depentanizer to separate the $C_4$'s and $C_5$'s in the overhead 44. Once again, the overhead 44 is hydrogenated at 46 to produce essentially the same $C_4$ and $C_5$ stream 65 as in FIG. 1. The bottoms stream 48 from the depentanizer 42, which now contains the $C_6+$ components including those from the heavies stream 8, is again fed to the gasoline hydrotreater 50 for partial hydrogenation, to the fractionator 54 for separation of the $C_9+$ fraction and to the hydrotreater 60 for final hydrogenation leaving the $C_6$ to $C_8$ gasoline stream 66 just as in FIG. 1. As can be seen, this FIG. 2 embodiment employs one less fractionator than the FIG. 1 embodiment but both of these schemes use five separate hydrogenators or hydrotreaters.

The object in these prior art processes is to separate the desired fractions and to selectively hydrogenate the $C_2$ and $C_3$ acetylenes and dienes as well as the $C_4$ and heavier acetylenes, dienes and olefins without hydrogenating the desired olefins, i.e., the ethylene and propylene. For example, the selective hydrogenation of a propylene cut is not only essential for the production of high purity propylene but the hydrogenation of the methyl acetylene and propadiene in this cut (collectively referred to as MAPD) produces additional propylene resulting in a high yield.

In the present invention, these separations and hydrogenations are carried out at least in part by catalytic distillation hydrogenation. Catalytic distillation is a process which combines conventional distillation with catalytic reactions. In the process of the present invention, the catalytic reaction is hydrogenation. Catalytic distillation employs the catalytic material within the distillation column as both a catalyst for the reaction and as a column packing for the distillation. The catalyst has both a distillation function and a catalytic function. For additional information relating to catalytic distillation in general and catalytic distillation hydrogenation in particular, reference is made to U.S. Pat. Nos. 4,302,356; 4,443,559 and 4,982,022. Catalytic distillation has previously been described for use in the purification of propylene rich streams containing small quantities and a limited number of acetylenic compounds and diolefins to form additional propylene by hydrogenation and recover the existing and formed propylene. See PCT International Patent Application No. PCT/US94/07758, International Publication No. WO 95/15934. However, the present invention is directed to the processing of a cracked gas feed stream containing a full range of carbon number components in significant quantities including ethylene, propylene, $C_3$ acetylenes and dienes, $C_4$ and $C_5$ acetylenes and dienes and olefins and $C_6+$ components including unsaturates. The present invention has the object of not only hydrogenating the acetylenes and dienes to produce additional propylene and other olefins but also hydrogenating the $C_4+$ olefins to form alkanes without losing any significant amount of the original propylene or the newly formed propylene and without fouling the catalyst beds. In the present invention, the overall process and the catalytic distillation portions of the process are specifically directed to accomplishing those objectives.

Figure 3:
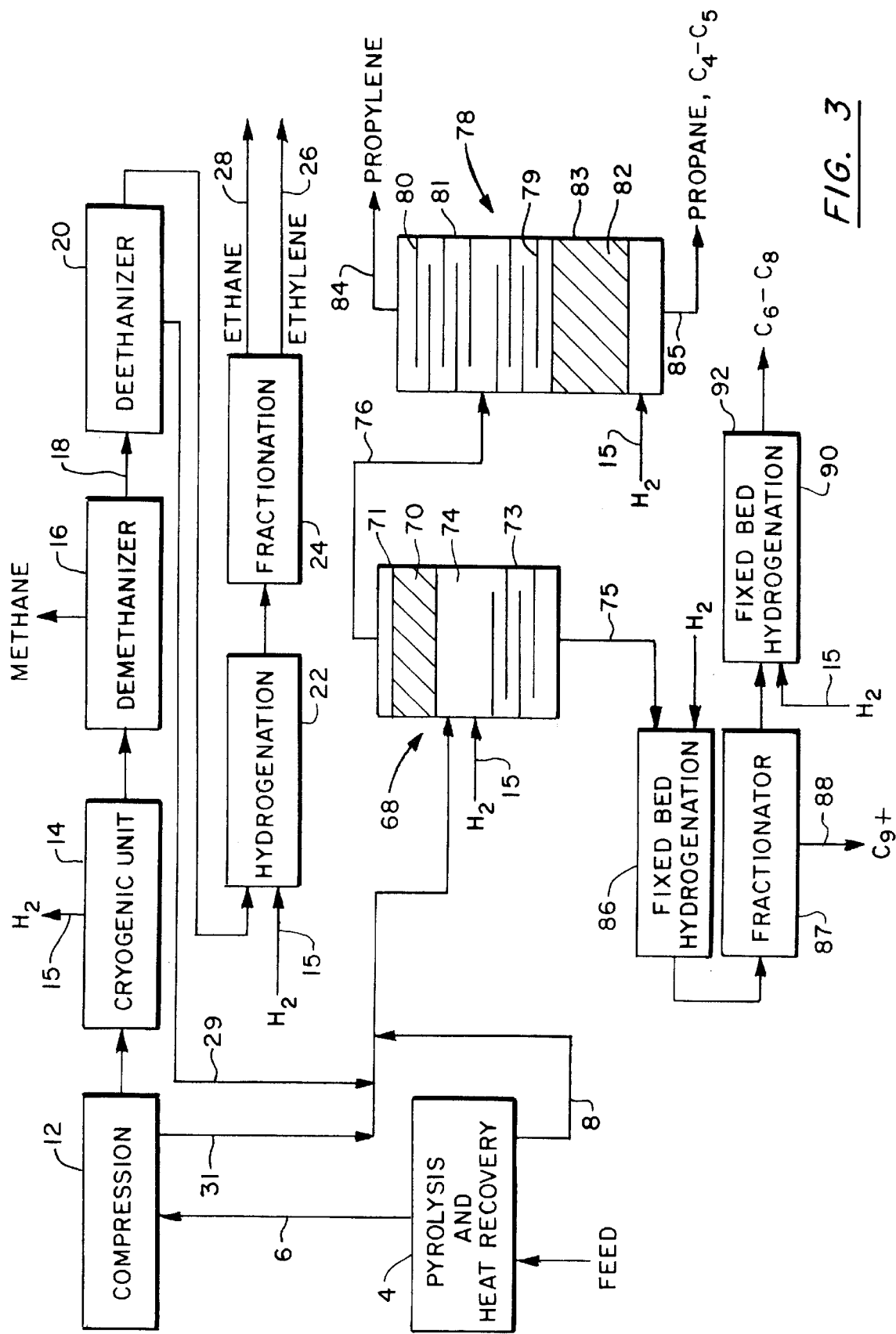
FIG. 3 is a flow sheet for an olefin plant according to the present invention.

Turning now to the present invention and referring first to the embodiment as depicted in FIG. 3, the deethanizer bottoms 29 are fed to the catalytic distillation hydrogenation tower 68 usually together with the heavies 8 from the front end and compressor condensates 31. Although various known hydrogenation catalysts can be used, one preferred catalyst is 0.3 wt. % palladium oxide on a spherical aluminum oxide support with a particle size of about ⅛ inch (3.2 mm). Other examples of typical hydrogenation catalysts are the Group VIII metals of the Periodic Table of Elements alone or in combinations and with promoters and modifiers such as palladium/gold, palladium/silver, cobalt/zirconium and nickel preferably deposited on a typical catalyst support. The tower 68 has a catalyst bed 70 in the enriching section 71 above the generally centrally located feed zone 74 and only fractionation devices, trays or packing, in the stripping section 73 below the feed zone 74. Hydrogen stream 15 is fed to the tower 68 below the catalyst bed 70. The distillation conditions of temperature and pressure within the tower 68 are maintained such that the $C_3$ to $C_5$ components are distilled overhead and the $C_6+$ are removed as bottoms 75. The MAPD, $C_4$'s and $C_5$'s acetylenes and di-olefins are mostly hydrogenated in the upper bed 70 with the MAPD being hydrogenated to propylene and the $C_4$ and $C_5$ being hydrogenated to corresponding olefins. Since the acetylenes and dienes will hydrogenate first, there is little or no hydrogenation of the propylene or $C_4$ and $C_5$ olefins in this bed 70. Only sufficient hydrogen is added to hydrogenate acetylenes and di-olefins. The overhead 76 from the tower 68 containing the $C_3$–$C_5$ mono-unsaturated and saturated components is fed to the tower 78 containing trays or packing 80 in the enriching section 81 and trays 79 (or packing) followed by catalyst bed 82 in the stripping section 83. The propylene is distilled overhead at 84 and the $C_4$ and $C_5$ unsaturates, mostly olefins, are hydrogenated in the bed 82 with the hydrogen stream 15. In catalytic distillation, it is generally preferable to hydrogenate in the enriching section of the tower rather than the stripping section. This is because higher molecular weight oligomers can form and more readily wash out of the catalyst bed. In tower 78, hydrogenation takes place in the stripping section. However, all acetylenes and dienes have already been removed in tower 68. Thus, the tendency to form oligomers is significantly reduced.

Fractionation devices, such as trays or packing, are preferably inserted between the feed to tower 78 and catalyst bed 82. these trays will reduce the propylene concentration in catalyst bed 82, reducing propylene hydrogenation losses and increasing the total flow of propylene exiting in stream 84. The propane and the resulting $C_4$ and $C_5$ alkanes are taken out as bottoms 85. The saturated $C_3$ to $C_5$ stream 85 would typically be recycled to the cracking heaters to produce additional desired dehydrogenated product, typically ethylene and propylene. The bottoms 75 from the tower 68 which now contains the mostly un-hydrogenated $C_6$+ components are further hydrogenated in a conventional fixed bed hydrogenator unit 86 and then fractioned at 87 to remove the $C_9$+ components as bottoms 88 and then further hydrotreated at 90 in another conventional fixed bed hydrogenation unit with hydrogen stream 15 to complete the hydrogenation. The product 92 is a saturated $C_6$–$C_8$ heart cut. Aromatics can be removed from this stream utilizing conventional technology. As can be seen, this embodiment of the invention, which achieves equivalent separations and reactions as the FIG. 1 and 2 processes, substitutes the two catalytic distillation hydrogenation units 68 and 78 for the depropanizer 30, the hydrogenator 34, the fractionator 36, and the hydrogenator 46.

One of the past concerns about hydrogenating the type of feed stream of the present invention has been the loss of propylene. In the present invention, the overhead stream from tower 68 contains all of the propylene entering the tower plus additional propylene formed from the hydrogenation of MA and PD. Because of the preference of the catalyst for the hydrogenation of the more highly unsaturated acetylene and diene hydrocarbons before the hydrogenation of the olefins occurs, there is high selectivity and little or no hydrogenation of the propylene or other olefins. The hydrogenation of the $C_4$ and $C_5$ olefins only takes place after the propylene has been separated in tray sections 79 and 80 of tower 78. Hydrogen is added in stream 15 to provide only the hydrogen required for the acetylene and diene hydrogenation to olefins with only a slight excess. High reflux ratios are also maintained in tower 68. This reflux removes the heat of reaction. More significantly, it decreases the concentration of propylene in the liquid phase in catalyst bed 70. This low concentration further reduces the tendency of propylene to hydrogenate.

Figure 4:
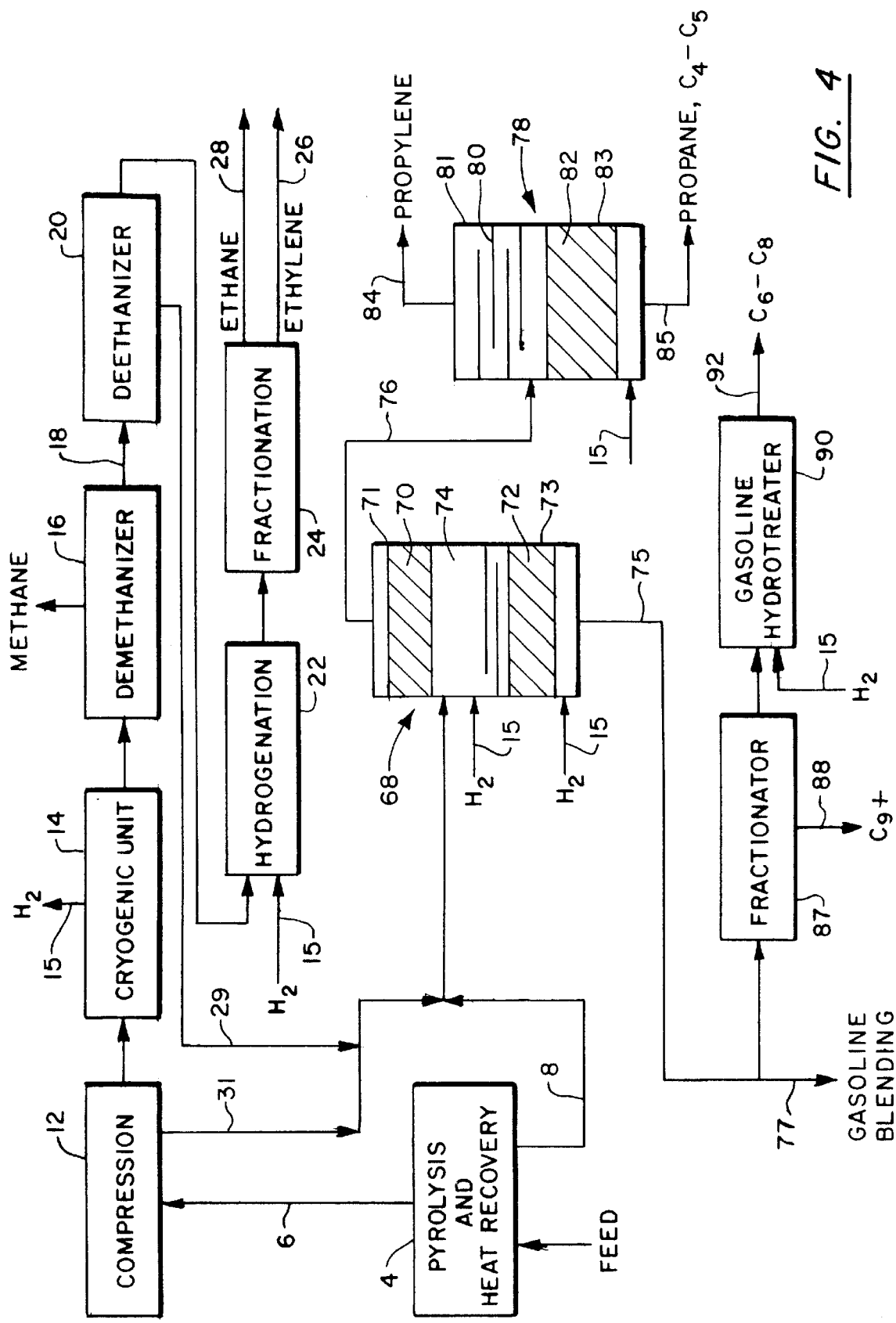
FIG. 4 is a flow sheet similar to FIG. 3 illustrating an alternate embodiment of the present invention.

It is possible to eliminate the additional fixed bed catalyst reactor as shown in FIG. 4. This scheme differs from FIG. 3 in that tower 68 now has hydrogenation catalyst in the stripping section. The tower 68 has a catalyst bed 70 in the enriching section 71 above the generally centrally located feed zone 74 and another catalyst bed 72 in the stripping section 73 below the feed zone 74. A tray or packing section is located below the feed before catalyst bed 72. Hydrogen streams 15 are fed to the tower 68 below each of the catalyst beds 70 and 72. The distillation conditions of temperature and pressure within the tower 68 are maintained such that the $C_3$ to $C_5$ components are distilled overhead and the $C_6$+ are removed as bottoms 75. The MAPD, $C_4$'s and $C_5$'s are mostly hydrogenated in the upper bed 70 with the MAPD being hydrogenated to propylene and the $C_4$ and $C_5$ being hydrogenated to other olefins. Since the acetylenes and dienes will hydrogenate first, there is little or no hydrogenation of the propylene or $C_4$ and $C_5$ olefins in this bed 70. Similarly, the $C_6$+ acetylenes and dienes and styrene as well are hydrogenated primarily to alkenes in the lower bed 72. The overhead 76 from the tower 68 containing the $C_3$–$C_5$ unsaturated and saturated components is fed to the tower 78 containing trays 80 in the enriching section 81 and a catalyst bed 82 in the stripping section 83. The propylene is distilled overhead at 84 and the $C_4$ and $C_5$ unsaturates, mostly olefins, are hydrogenated in the bed 82 with the hydrogen stream 15. The propane and the resulting $C_4$ and $C_5$ alkanes are taken out as bottoms 85. The bottoms 75 from the tower 68, which now contains the hydrogenated $C_6$+ components, can be blended directly into gasoline at 77. Alternately, stream 75 can be fractionated at 87 to remove the $C_9$+ components as bottoms 88 and then further hydrotreated at 90 with hydrogen stream 115 to complete the hydrogenation. The product 92 is a saturated $C_6$–$C_8$ heart cut from which aromatics can be recovered. As can be seen, this embodiment of the invention, which achieves equivalent separations and reactions as the FIGS. 1 and 2 processes, substitutes the two catalytic distillation hydrogenation units 68 and 78 for the depropanizer 30, the hydrogenator 34, the fractionator 36, the hydrogenator 46 and the hydrotreater 50, a significant savings in equipment.

Figure 5:
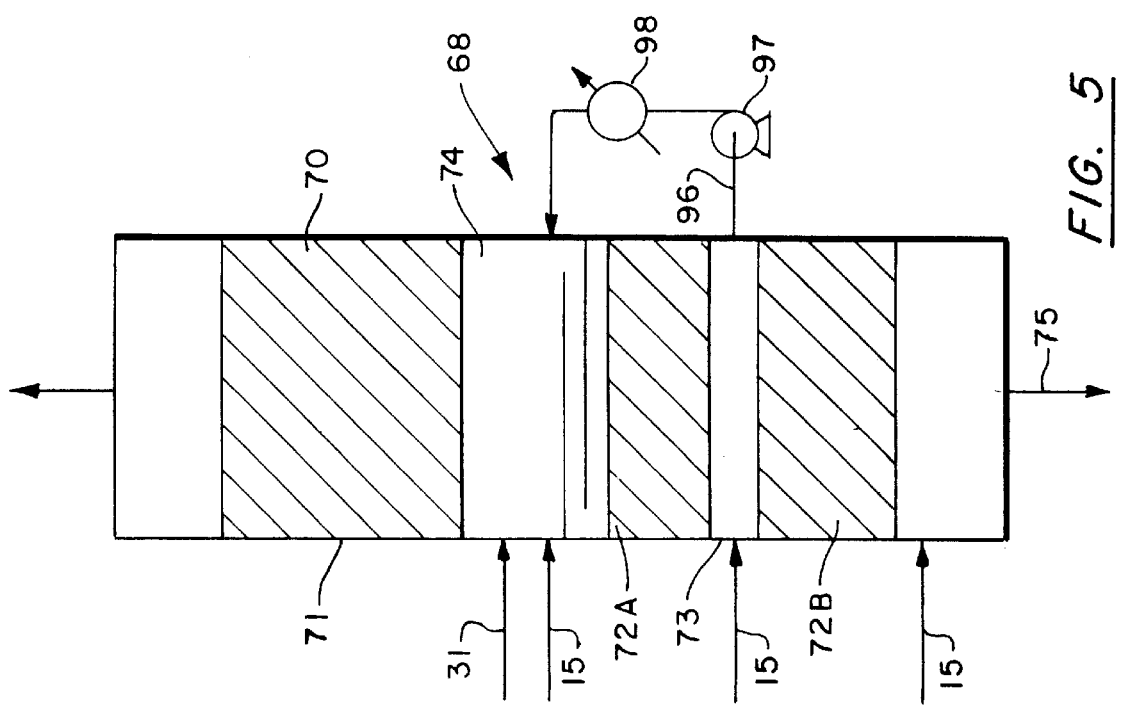

One of the reasons that hydrogenation in a stripping section of a tower such as tower 68 has not been employed in the past (such as in the previously mentioned International Application PCT/US94/07758) is the potential for fouling of the catalyst bed such as bed 72. The hydrogenation of $C_3$–$C_5$ acetylenes and dienes has the highest possibility of creating fouling through the formation of long chain oligomers or polymers. In the present invention, the $C_3$–$C_5$ acetylenes and dienes are essentially totally hydrogenated in the enriching section. Therefore, in FIG. 3 it is only olefins which are hydrogenated in the stripping section 83 of tower 78, thereby reducing considerably the fouling problem. FIG. 5 shows an alternate arrangement for the tower 68 to further alleviate the fouling problem for the arrangement shown in FIG. 4. In this arrangement, the bed 72 is split into two or even more separate beds 72A and 72B. The bed 72A can be a more selective catalyst in that it will primarily only support the hydrogenation of the more highly unsaturated compounds. Therefore, at this location in the tower where some propylene may be present, only the acetylenes and dienes are hydrogenated. On the other hand, the catalyst in bed 72B can be more active and non-selective which will cause the hydrogenation of all the remaining unsaturates present at that location. As one example only, the catalyst in bed 72B may have a higher metal content, such as palladium oxide, than the metal content of the catalyst in bed 72A.

Figure 6:
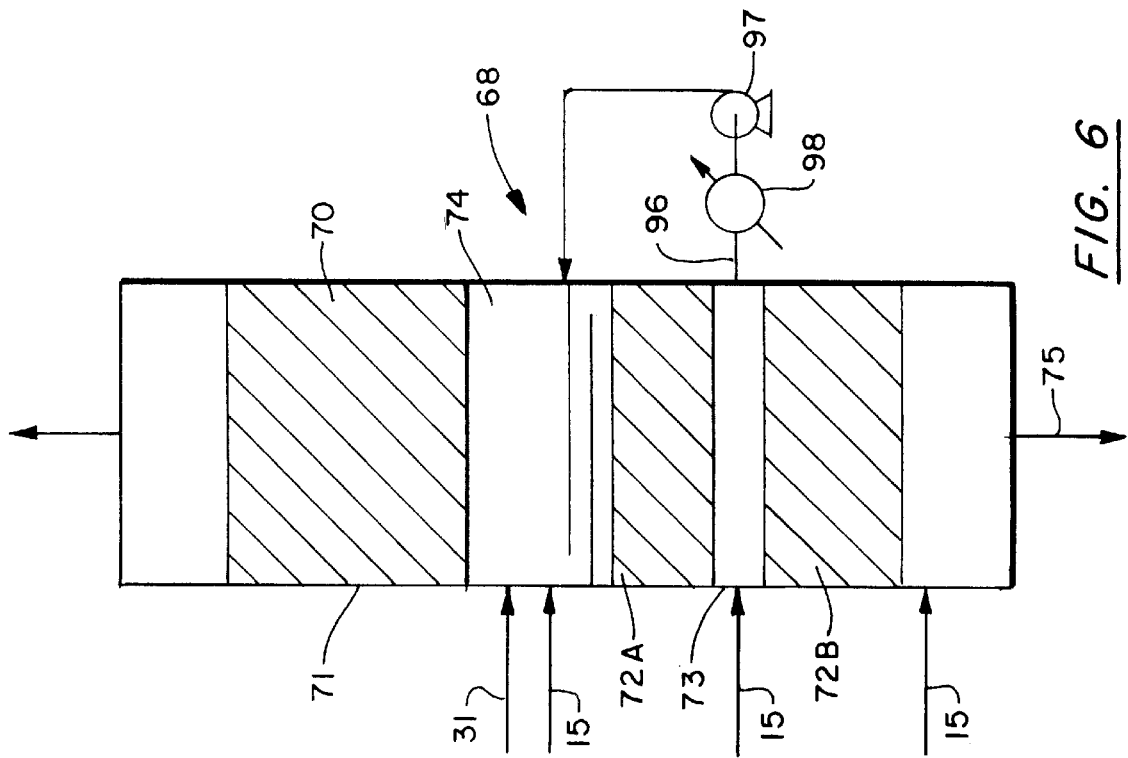
FIGS. 5 and 6 show alternate arrangements for the catalytic distillation tower of FIG. 4.

Another technique used in FIG. 5 to prevent the hydrogenation of propylene in the upper portion of the stripping section is to pump liquid around in the stripping section. A bottoms side stream 96 is withdrawn by the pump 97 and cooled at 98 and then injected back into the feed zone 74 above the stripping section 73. Alternately, in FIG. 6, a vapor stream can be withdrawn, condensed at 98, and then pumped at 97 back to the top of the catalyst bed. Withdrawing a vapor stream results in a lower concentration of oligomers and other heavy material being recycled to the top of the catalyst bed. This pump around not only removes heat of reaction and increases the wetting of the catalyst but it also dilutes the concentration of acetylenes and dienes which are present and which would otherwise tend to cause fouling.

Another factor decreasing the effect of oligomer formation in the FIG. 4 scheme is the high concentration of aromatics present in the stripping section. The $C_6$–$C_9$ fraction from a steam cracker is predominantly aromatics. The concentration of acetylenes and dienes is low. This is because these compounds cyclize in the cracking heater coils, forming aromatics. Since aromatic compounds are good solvents, they tend to reduce the rate of fouling.

Figure 7:
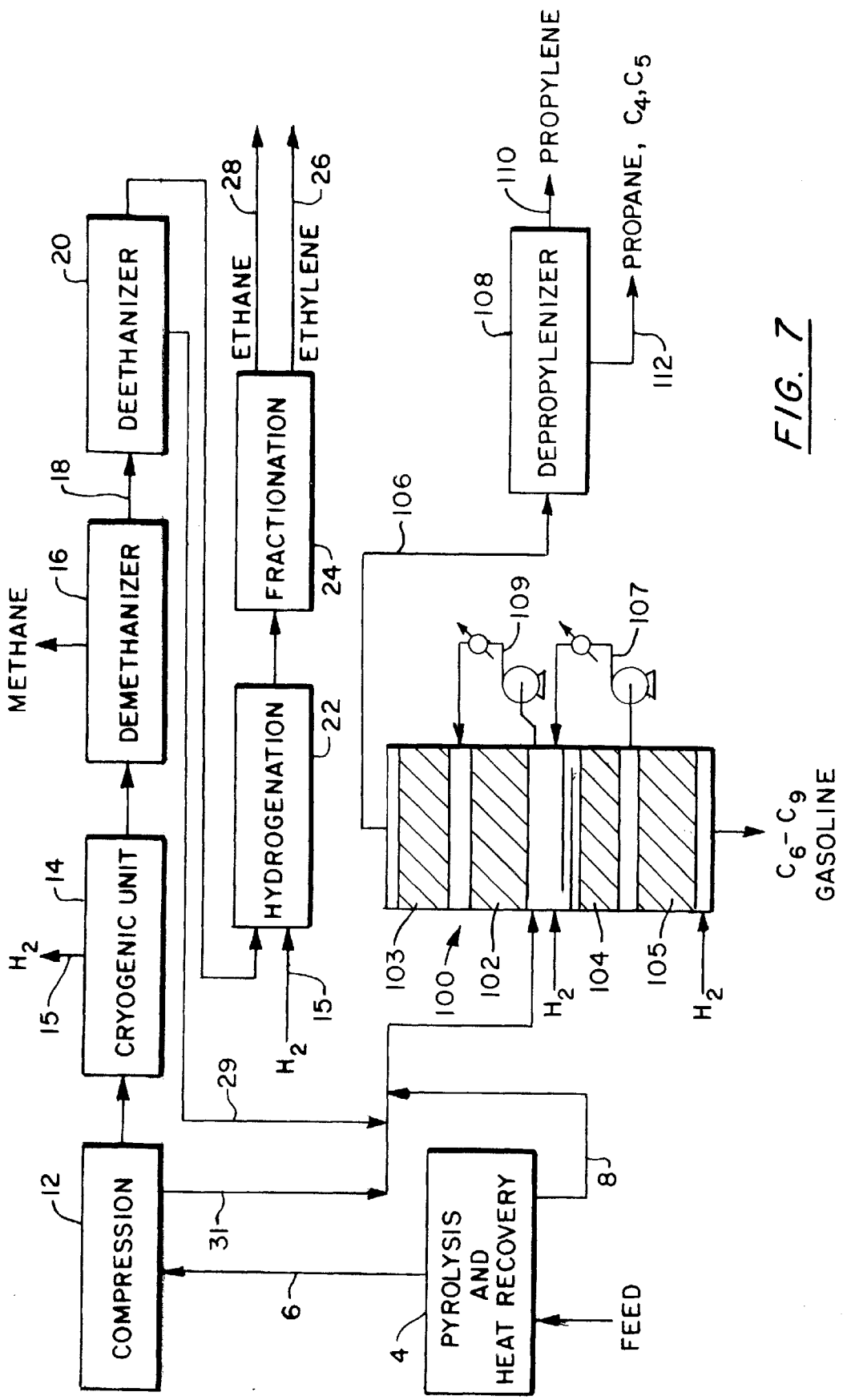
FIGS. 7 to 10 are flow sheets similar to the flow sheets of FIGS. 3 and 4 but illustrating further alternate embodiments of the present invention.

A further variation of the present invention is shown in FIG. 7 where the catalytic distillation hydrogenation unit 100 contains two catalyst beds 102 and 103 in the upper portion above the feed and two more catalyst beds 104 and 105 in the lower portion below the feed. A tray section between the feed point and catalyst section 104 is desirable. MAPD, $C_4$'s and $C_5$'s are mostly hydrogenated in the upper portion while the $C_6$+ are mostly hydrogenated in the lower portion. The overhead 106 from the depentanizer column 100 containing the $C_3$–$C_5$ components is fed to the depropylenizer 108 where the propylene product is separated from the basically saturated $C_3$–$C_5$ components 112 which are recycled to the pyrolysis heater. The $C_6$+ bottoms 114 from the depentanizer 100 can be blended directly into gasoline. In this FIG. 7 embodiment, some of the same techniques are used as in FIG. 3. High reflux ratios are utilized to remove heat of reaction and dilute the concentration of propylene in the liquid phase. The pump around circuit generally designated 107 is employed for the same reasons as in FIG. 5. In addition, the enriching section now also has two separate catalyst beds 102 and 103 and employs a pump around circuit 109. In general, catalyst bed 102 would hydrogenate acetylenes and di-olefins and catalyst bed 103 would hydrogenate some or all of the $C_4$–$C_5$ olefins. The catalyst in the bed 102 would be less active and more selective than the catalyst in bed 103. The pump around circuit 109 serves to maintain a high mass flow in catalyst bed 102 to regulate temperatures and reactant concentrations and keep the catalyst highly liquid loaded.

The stripping section also contains two catalyst beds with the upper bed 104 more selective than the bottom bed 105. Acetylenes and dienes and styrenes are generally hydrogenated in catalyst bed 104 and olefins are generally hydrogenated in catalyst bed 105. Product stream (88 and 92) is a low unsaturate stream suitable for gasoline blending without further treatment if low sulfur containing feedstocks are utilized in the pyrolysis heaters. This FIG. 7 scheme has higher losses of propylene and greater tendency for catalyst fouling than the process schemes of FIGS. 3 to 6 but the capital cost is lower as all of the hydrogenation is contained in one tower.

Figure 8:
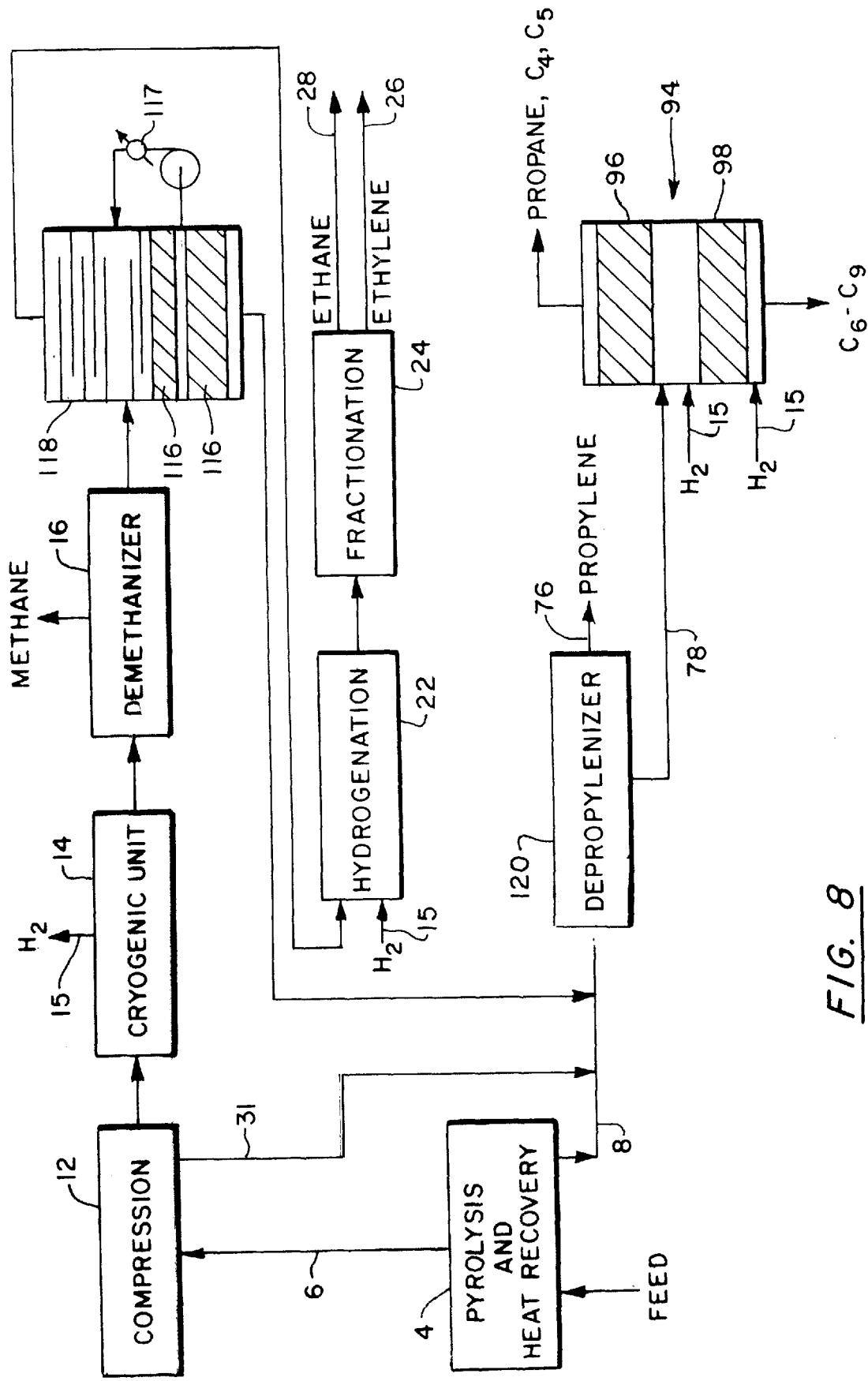

FIG. 8 is a further variation of the invention and involves the use of catalytic distillation hydrogenation in conjunction with the deethanizer. One or more hydrogenation catalyst beds 116 are placed in the bottom of the deethanizer column 118. The overhead from the deethanizer, which still contains the $C_2$ acetylenes, the ethylene and the ethane, is handled the same as in FIGS. 3 to 6. In the catalyst beds 116 in the bottom part of the deethanizer 118, the $C_3$+ acetylenes and dienes can be totally or at least mostly hydrogenated. Catalyst fouling tendencies are a concern; however they are mitigated by the high concentration of aromatics present. Also, the use of two or more catalyst beds and pump around will minimize catalyst fouling tendencies. Fouling of the reboiler is minimized as the acetylenes and dienes are hydrogenated before the reboiler. Since hydrogenation is now taking place in the deethanizer, the depropylenizer 120 need not have catalytic distillation and hydrogenation as in the FIGS. 3 to 6 arrangement. The depropylenizer 120 now merely involves fractionation to separate the propylene from the bottoms 78. In this scheme, the balance of the hydrogenation which is not completed in the deethanizer 118 is essentially completed in the depentanizer 94. As shown in this FIG. 8, the deethanizer 118 could utilize a side condenser 117 in the pump around to remove the heat of the hydrogenation reaction, in addition to use of a pump around.

Figure 9:
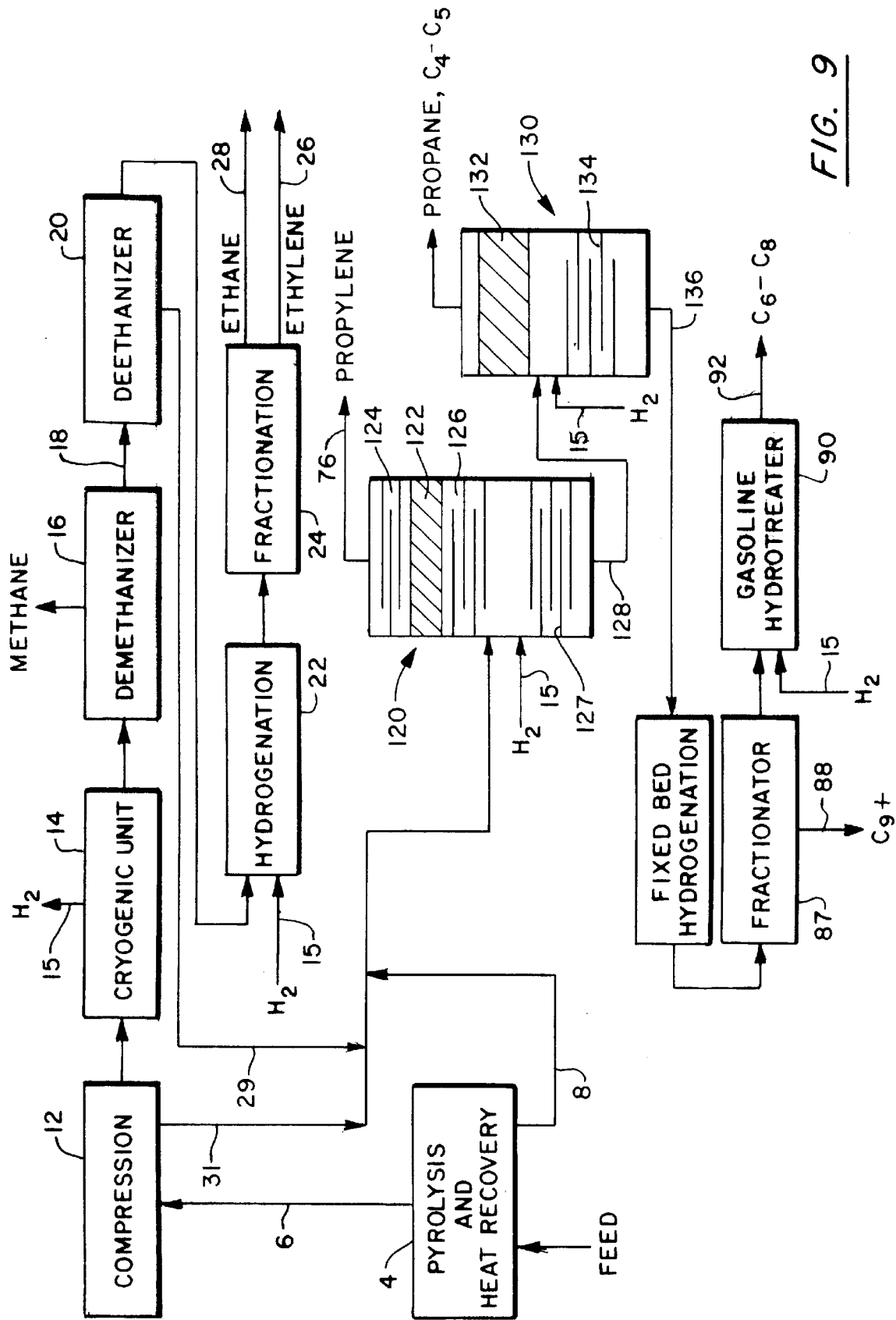
Figure 10:
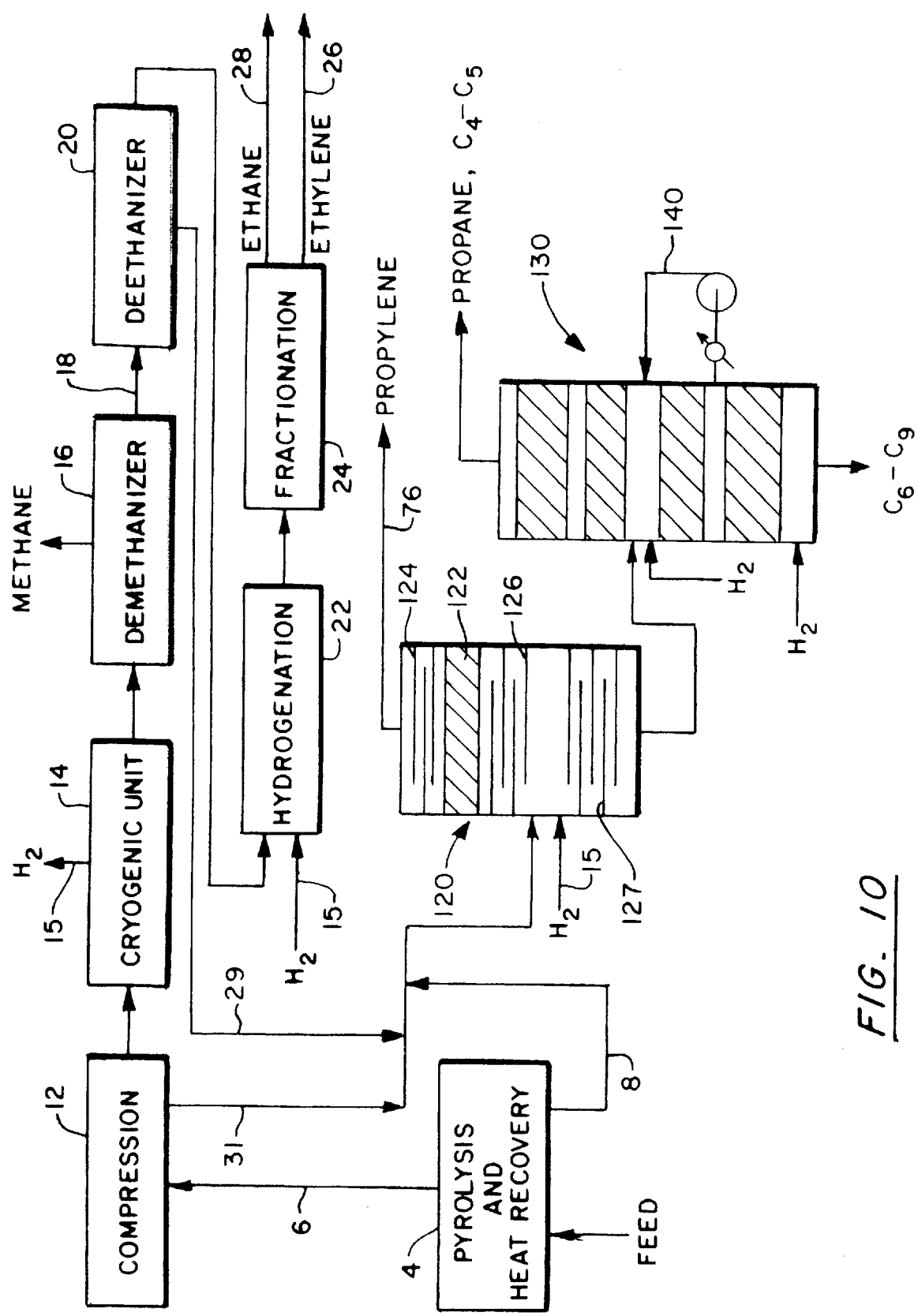

Other process schemes are also possible utilizing the general principles outlined. For example, in FIG. 9, The hydrocarbon is fed to the tower 120 which is now functioning as a depropylenizer. The catalytic distillation bed 122 in the enriching section now has trays 124 above and 126 below as well as the trays 127 in the stripping section. In this catalytic distillation bed 122, MA and PD are hydrogenated, mostly to propylene. The high reflux ratio required for separation of propylene easily removes the heat of reaction and provides sufficient liquid flow for optimum catalyst performance. The bottoms from the column, stream 128, is fed to a depentanizer 130. The depentanizer has a catalytic distillation bed in the enriching section and trays 134 in the stripping section. In this catalytic distillation bed 132, all $C_4$–$C_5$ acetylenes, dienes and olefins are hydrogenated to $C_4$–$C_5$ alkanes. A high reflux ratio is utilized to remove heat of reaction. The bottoms 136 from the depentanizer 130 is sent to conventional gasoline hydrogenation. In FIG. 10, the same scheme is utilized except that the depentanizer 130 has a catalytic distillation section in the stripping section and produces a product suitable for gasoline blending. This FIG. 10 also illustrates each catalyst bed being divided into two sections. Also, the beds in the enriching section and the beds in the stripping section have each been illustrated as being split into two separate sections which may contain catalysts of different activity. A pump around cooler system 140 around the catalyst bed below the feed will assist in removing heat of reaction.

What is claimed is:

1. A method of processing a cracked feed stream containing hydrogen, $C_2$ components including ethylene, $C_3$ components including propylene, acetylenes and dienes, $C_4$ and $C_5$ components including acetylenes, dienes and olefins and $C_6$+ components including unsaturates to recover said ethylene and propylene therefrom and to hydrogenate said $C_3$ acetylenes and dienes to produce additional propylene and to hydrogenate at least some of said $C_4$ and $C_5$ acetylenes, dienes and olefins to saturates and to hydrogenate said $C_6$+ unsaturates to a mixture of olefins and saturates without significantly hydrogenating said ethylene and propylene comprising the steps of:

a. separating said hydrogen and said $C_2$ components from said feed stream leaving a $C_3$+ stream;

b. separating said ethylene as a product from said separated $C_2$ components;

c. introducing said $C_3$+ stream and a quantity of hydrogen into the feed zone of a reaction distillation column having an enriching section above said feed zone and a stripping section below said feed zone and wherein at least said enriching section contains a hydrogenation catalyst;

d. distilling said $C_6+$ unsaturates as bottoms;

e. contacting said $C_6+$ bottoms with hydrogen and a hydrogenation catalyst whereby said $C_6+$ unsaturates are hydrogenated to $C_6+$ olefins and saturates;

f. distilling said $C_3$, $C_4$ and $C_5$ components and concurrently contacting said $C_3$, $C_4$ and $C_5$ components with said hydrogenation catalyst in said enriching zone to produce an overhead and maintaining conditions within said enriching zone including the hydrogen concentration produced by said quantity of hydrogen introduced whereby said $C_3$ acetylenes and dienes are hydrogenated to produce additional propylene and whereby said propylene remains unhydrogenated and whereby said $C_4$ and $C_5$ acetylenes and dienes and olefins are at least partially hydrogenated; and g. separating and recovering said propylene as a product from said overhead and further hydrogenating said at least partially hydrogenated $C_4$ and $C_5$ acetylenes and dienes and olefins in said overhead to produce saturated $C_4$ and $C_5$ components.

2. A method as recited in claim 1 wherein said stripping section also contains a hydrogenation catalyst and wherein said steps (d) and (e) of distilling and hydrogenating said $C_6+$ unsaturates concurrently occur in said stripping section.

3. A method as recited in claim 2 wherein said step of recovering propylene comprises the step of fractionating said propylene from said $C_4$ and $C_5$ components.

4. A method as recited in claim 3 wherein said $C_6+$ components include $C_6$ to $C_8$ components and $C_9+$ components and further including the step of fractionating said bottoms and separating an overhead stream containing essentially all of said $C_6$ to $C_8$ components and a bottoms stream containing essentially all of said $C_9+$ components and further hydrogenating said $C_6$ to $C_8$ overhead stream.

5. A method as recited in claim 2 wherein said cracked feed stream further includes heavy cracked gasoline and wherein said at least a portion of said heavy cracked gasoline is separated from said cracked feed stream prior to said step (a) of separating said $C_2$ components and further including the step of feeding said separated heavy cracked gasoline into said reaction distillation column together with said $C_3+$ stream and hydrogen.

6. A method as recited in claim 1 wherein said step (a) of separating said $C_2$ components from said feed stream leaving a $C_3+$ stream and said step (c) of introducing said $C_3+$ stream and hydrogen into a reaction distillation column containing a hydrogenation catalyst comprise the step of introducing said feed stream into a reaction distillation column containing a distillation section in the upper portion thereof for the separation of $C_2$ components and a reaction distillation section containing said catalyst in the lower portion thereof for the combined separation of $C_2$ components and hydrogenation of $C_3+$ components.

7. A method as recited in claim 1 wherein said cracked gas feed stream is obtained by the step of cracking a hydrocarbon feedstock and wherein said $C_3+$ stream further contains propane and wherein said steps of distilling said $C_3+$ stream includes the step of separating said propane and said $C_4$ and $C_5$ saturates and recycling said separated propane and $C_4$ and $C_5$ saturates to said step of cracking.

8. A method as recited in claim 2 wherein said steps (d) and (e) of distilling and hydrogenating said $C_6+$ components in said stripping section further includes the step of feeding pump-around upwardly from below said stripping section hydrogenation catalyst to above said stripping section hydrogenation catalyst.

9. A method as recited in claim 8 wherein said hydrogenation catalyst in said stripping section comprises an upper section of hydrogenation catalyst and a lower section of hydrogenation catalyst and wherein said upper section contains a hydrogenation catalyst with a less active hydrogenation catalyst in said lower section.

10. A method as recited in claim 9 and further including the step of feeding pump-around from below said upper section to above said upper section.

11. A method as recited in claim 1 wherein said step (g) of recovering propylene from said overhead comprises the steps of:

i. introducing said overhead into the feed zone of a second reaction distillation column having an enriching section above said feed zone and a stripping section below said feed zone and wherein said stripping section contains a hydrogenation catalyst;

ii. introducing hydrogen into said second reaction distillation column below said hydrogenation catalyst;

iii. distilling said propylene overhead and hydrogenating said $C_3$, $C_4$ and $C_5$.

12. A method as recited in claim 1 wherein said step (g) of recovering propylene from said overhead comprises the steps of:

i. introducing said overhead into the feed zone of a second reaction distillation column having an enriching section above said feed zone and a stripping section below said feed zone and wherein said stripping section contains a hydrogenation catalyst;

ii. introducing hydrogen into said second reaction distillation column bellow said hydrogenation catalyst;

iii. introducing said $C_3+$ stream into a series of reaction distillation columns including at least one reaction distillation enriching section containing a hydrogenation catalyst and at least one reaction distillation stripping section containing a hydrogenation catalyst;

iv. introducing hydrogen into said reaction distillation enriching and stripping sections;

v. hydrogenating at least said $C_3$ acetylenes and dienes to propylene in one of said reaction distillation enriching sections without hydrogenating said propylene;

vi. hydrogenating said $C_4$ and $C_5$ acetylenes, dienes and olefins at least partially to saturates in one of said reaction distillation sections;

vii. distilling said propylene as a product from said $C_4$ and $C_5$ components; and viii. hydrogenating said $C_6+$ unsaturates in one of said reaction distillation stripping sections.

13. A process for treating a cracked gas feed stream containing $C_3$ unsaturated components including propylene, acetylenes and dienes, and $C_4$ and $C_5$ unsaturated components including acetylenes, dienes and olefins to hydrogenate said $C_3$ acetylenes and dienes and to hydrogenate at least one of said $C_4$ unsaturates and said $C_5$ unsaturates without hydrogenating said propylene by selectively hydrogenating said $C_3$ acetylenes and dienes in a first catalytic distillation bed in a first catalytic distillation unit thereby producing additional propylene, distilling said propylene and said additional propylene overhead and producing a stream containing said $C_4$ and $C_5$ unsaturated components, nonselectively hydrogenating at least one of said $C_4$ unsaturated components and said $C_5$ unsaturated components in a second catalytic distillation bed in a second catalytic distillation unit.

14. A process as recited in claim 13 wherein said first catalytic distillation bed is in the enriching section of said first catalytic distillation unit and said second catalytic distillation bed is in the enriching section of said second catalytic distillation unit.

15. A process as recited in claim 13 wherein said first catalytic distillation bed is in the enriching section of said first catalytic distillation unit and said second catalytic distillation bed is in the stripping section of said second catalytic distillation unit.

* * * * *

UNITED STATES PATENT AND TRADEMARK OFFICE
CERTIFICATE OF CORRECTION

PATENT NO. : 5,925,799
DATED : July 20, 1999
INVENTOR(S) : Stephen J. Stanley et al It is certified that error appears in the above-indentified patent and that said Letters Patent is hereby corrected as shown below:

Column 10, line 41, "bellow" should read --below--.

Signed and Sealed this

Ninth Day of May, 2000

Attest:

Q. TODD DICKINSON

Attesting Officer

Director of Patents and Trademarks